United States Patent
Chheda et al.

(10) Patent No.: US 7,003,656 B2
(45) Date of Patent: Feb. 21, 2006

(54) AUTOMATIC SELECTION OF FIRMWARE FOR A COMPUTER THAT ALLOWS A PLURALITY OF PROCESS TYPES

(75) Inventors: Sachin Chheda, Roseville, CA (US); Dhruv Choksey, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 510 days.

(21) Appl. No.: 10/171,873

(22) Filed: Jun. 13, 2002

(65) Prior Publication Data

US 2003/0233536 A1 Dec. 18, 2003

(51) Int. Cl.
*G06F 15/177* (2006.01)
(52) U.S. Cl. ............... 713/1; 713/2; 713/100
(58) Field of Classification Search ............ 713/1, 713/2, 100
See application file for complete search history.

(56) References Cited

U.S. PATENT DOCUMENTS

| | | | |
|---|---|---|---|
| 4,654,783 A | 3/1987 | Veres et al. | |
| 5,848,250 A * | 12/1998 | Smith et al. | 710/300 |
| 5,933,652 A | 8/1999 | Chen et al. | |
| 5,958,037 A | 9/1999 | Dreyer et al. | |
| 6,381,693 B1 * | 4/2002 | Fish et al. | 713/1 |
| 6,425,079 B1 | 7/2002 | Mahmoud | |
| 6,591,352 B1 * | 7/2003 | Lambino et al. | 711/166 |
| 6,594,756 B1 * | 7/2003 | Datta et al. | 713/2 |
| 2004/0049669 A1 * | 3/2004 | Schelling et al. | 713/2 |

FOREIGN PATENT DOCUMENTS

| | | |
|---|---|---|
| EP | 1335283 A2 | 8/2003 |
| GB | 0312824.6 | 12/2003 |
| WO | WO91/19244 | 12/1991 |

* cited by examiner

*Primary Examiner*—Chun Cao

(57) ABSTRACT

A firmware selector is provided for a computer that includes a processor. The selector receives the identity of the processor, and in response to the identity, causes the processor to access firmware that corresponds to the processor. Because such a selector can automatically direct the processor to the appropriate firmware when the computer stores multiple firmware, the selector allows a customer to change the processor without requiring him to change the firmware memory or the board on which the firmware memory resides.

9 Claims, 3 Drawing Sheets

AUTOMATIC SELECTION OF FIRMWARE FOR A COMPUTER THAT ALLOWS A PLURALITY OF PROCESS TYPES

BACKGROUND

The computer industry is continually creating new generations of processors that provide increased speed, additional features, and other improvements over processors from previous generations.

Instead of requiring a customer to replace a computer when a new processor becomes available, computers are being produced that accept several different processors. Consequently, the customer can change a computer to a different processor by merely replacing the existing processor with a new processor. A processor change can be motivated for a variety of reasons. For example, servers (a type of computer) are being produced that can accept processors from either of two processor families, such as the Itanium processor family from Intel or the PA-RISC processor family from Hewlett-Packard. Sometimes, it is desirable for the customer to change the processor in the server to take advantage of an improved processor architecture. In other situations, the customer may be forced to change processors when a manufacturer discontinues support for a particular processor. Alternatively, a manufacturer may initially sell a customer a server with a low-end processor. As the customer's computing needs grow, the customer may wish to increase the server's capabilities by upgrading the server processor.

Each processor typically requires its own firmware because of the differences in the processor architectures from processor to processor. Throughout the specification, claims, and drawings, the term "firmware" means the software, including code and data structures, that controls a computer between the time it is turned on (hereafter "start") and the time the primary operating system takes control of the computer. Firmware's responsibilities include determining the hardware configuration, testing and initializing the hardware, loading the operating system, providing interactive debugging facilities in case of faulty hardware or software, and runtime services for the operating system. See, IEEE Std. 1275-1994, Standard for Boot Firmware (Initialization Configuration) (rev. 2.1); *IEEE Standard Dictionary of* Boot Firmware (Initialization Configuration) (rev. 2.1); *IEEE Standard Dictionary of Electrical and Electronics Terms* 411 (6$^{th}$ ed. 1996). Firmware may include any platform specific software, code, and data structures.

One of the tasks that the processor performs while executing the firmware is to configure itself and/or hardware peripherals, such as disk drives and other bus interfaces. Because different types of processors typically have different architectures and, thus, have different configuration requirements, each type of processor typically requires different firmware. Consequently, a problem with upgrading a processor is that the firmware typically must also be changed. Since the firmware typically resides on a memory chip that is separate from the processor, the user often changes the firmware by replacing this chip, or by replacing the board on which the chip resides. Such replacement can be difficult, time consuming, and/or expensive for the customer, particularly when upgrading multiple computers.

FIG. 1 is a schematic block diagram of a conventional computer 100. Examples of the computer 100 include, but are not limited to, a server, general purpose personal computer (PC), hand-held or lap top computers, multiprocessor systems, microprocessor-based systems, programmable consumer electronics, network computers, Personal Communication Systems (PCS), Personal Digital Assistants (PDA), minicomputers, mainframe computers, and distributed computing environments that include any one or more of the above computing systems or devices. In a basic configuration (represented by dashed line 106), the computer 100 typically includes at least one processor 102 and system memory 104. The processor 102 is the primary intelligence and controller for the computer 100, and can be any one of many commercially available processors available in the industry. Depending on the configuration of the computer 100, the system memory 104 may include a volatile memory 120 (such as RAM), and a non-volatile memory 122 (such as ROM or flash memory, etc.), or some combination of the two memory types.

The computer 100 may also have an advanced configuration that has additional features and functionality. For example, the computer 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and non-volatile, removable and non-removable media implemented in any method or technology for storage of information such as computer readable instructions, data structures, program modules or other data. The system memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 100. Any such computer storage media may be part of computer 100.

The computer 100 may also include communications connection(s) 112 that allow the computer to communicate with other computers/devices. Computer 100 may also have input device(s) 114 such as keyboard, mouse, pen, voice input device, touch input device, etc. Output device(s) 116 such as a display, speakers, printer, etc. may also be included. All these devices are well known in the art and will not be discussed. As discussed above, the system memory 104 typically includes a non-volatile memory, such as a non-volatile flash memory 122, which stores the firmware 124 for the processor 102. The flash memory 122 can be any type of non-volatile read/write memory, such as an EEPROM that can be electronically erased and reprogrammed, thus allowing convenient upgrading.

During the start of the computer 100, the processor 102 executes the firmware stored in the flash memory 124. While executing the firmware 124, the processor 102 initializes and tests the components of the computer 100 such as the processor unit 102, chipsets, and memory.

Unfortunately, when a customer changes the processor 102 to a different architecture, the customer typically must replace the non-volatile memory 122 that contains the firmware 124, or the circuit board (not shown) that carries the non-volatile memory 122.

SUMMARY

In one embodiment of the invention, a firmware selector is provided for a computer that includes a processor. The selector receives the identity of the processor, and in response to the identity, causes the processor to access firmware that corresponds to the processor.

Because such a selector can direct the processor to the appropriate firmware when the computer stores multiple firmware, the selector allows a customer to change the processor without requiring changing the firmware memory or circuit board.

These and various other features and advantages of the present invention will be apparent from a reading of the following detailed description and a review of the associated drawings.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

Figure 1:
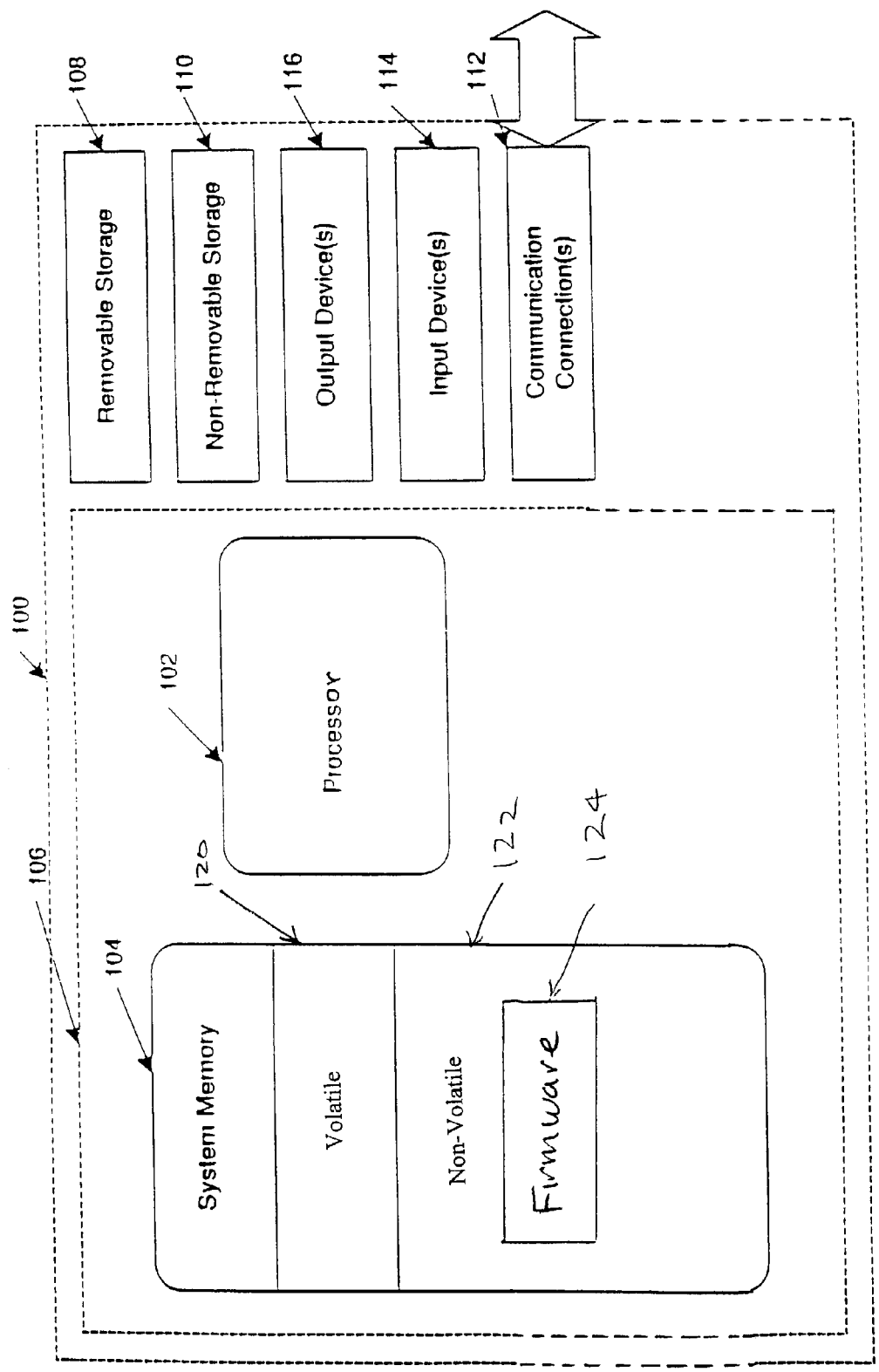
FIG. 1 is a schematic block diagram of a conventional computer.

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense, and the scope of the present invention is defined only by the appended claims.

Throughout the specification and claims, the following terms take the meanings explicitly associated herein unless the context dictates otherwise. The term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, or data signal. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

Figure 2:
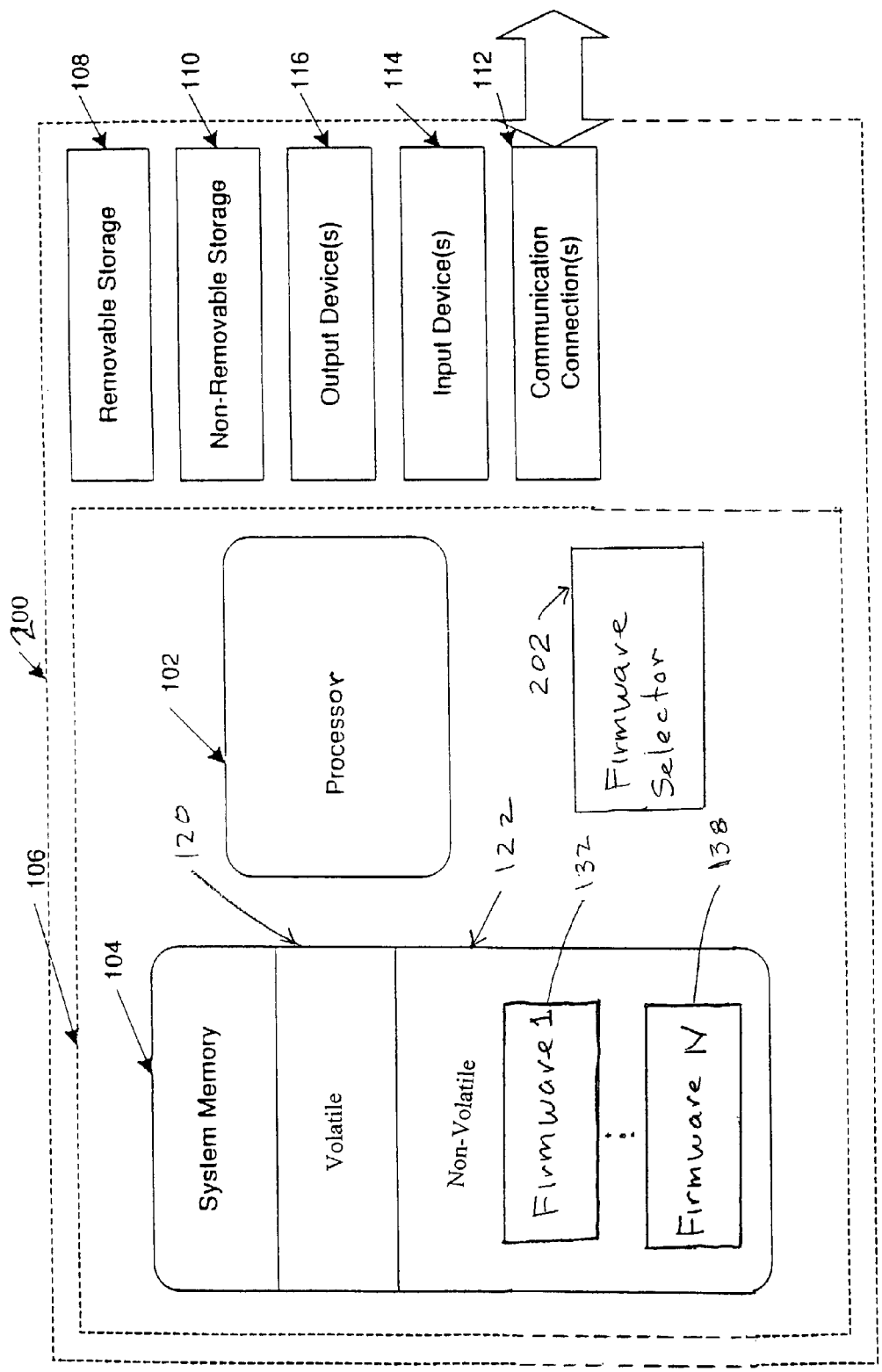
FIG. 2 is a schematic block diagram of a computing device that includes a firmware selector according to an embodiment of the invention.

FIG. 2 is a schematic block diagram of a computer 200, which allows one to change a processor without replacing or reprogramming the firmware memory according to an embodiment of the invention. Components common to the computer 100 of FIG. 1 and the computer 200 are referenced with like numbers. The computer 200 includes a firmware selector 202, and a plurality of firmware memories 1 (132) through N (138), which form a part of the non-volatile memory 122. Each firmware is appropriate for and corresponds to a particular type processor 102. Alternatively, the plurality of firmware can be stored on a single non-volatile memory device. The structure of the firmware selector 202 is further described below in conjunction with FIG. 3.

The processor 102 provides an identification to the selector 202, which then causes the processor to execute the appropriate, corresponding firmware stored in one of the non-volatile memories 1–N (132–138). The identifier is a single or multi-bit value that may identify characteristics such as the processor's architecture, manufacturer, and family. On starting the computer 200, the processor 102 provides its identifier to the firmware selector 202. In response to the identifier, the firmware selector 202 selects for the processor 102 the corresponding memory 1–N that stores the appropriate and corresponding firmware for the processor. If the processor 102 is changed, then on restarting the computer, the firmware selector 202 automatically selects the corresponding memory 1–N (132–138) that stores the appropriate and corresponding firmware for the new processor.

Figure 3:
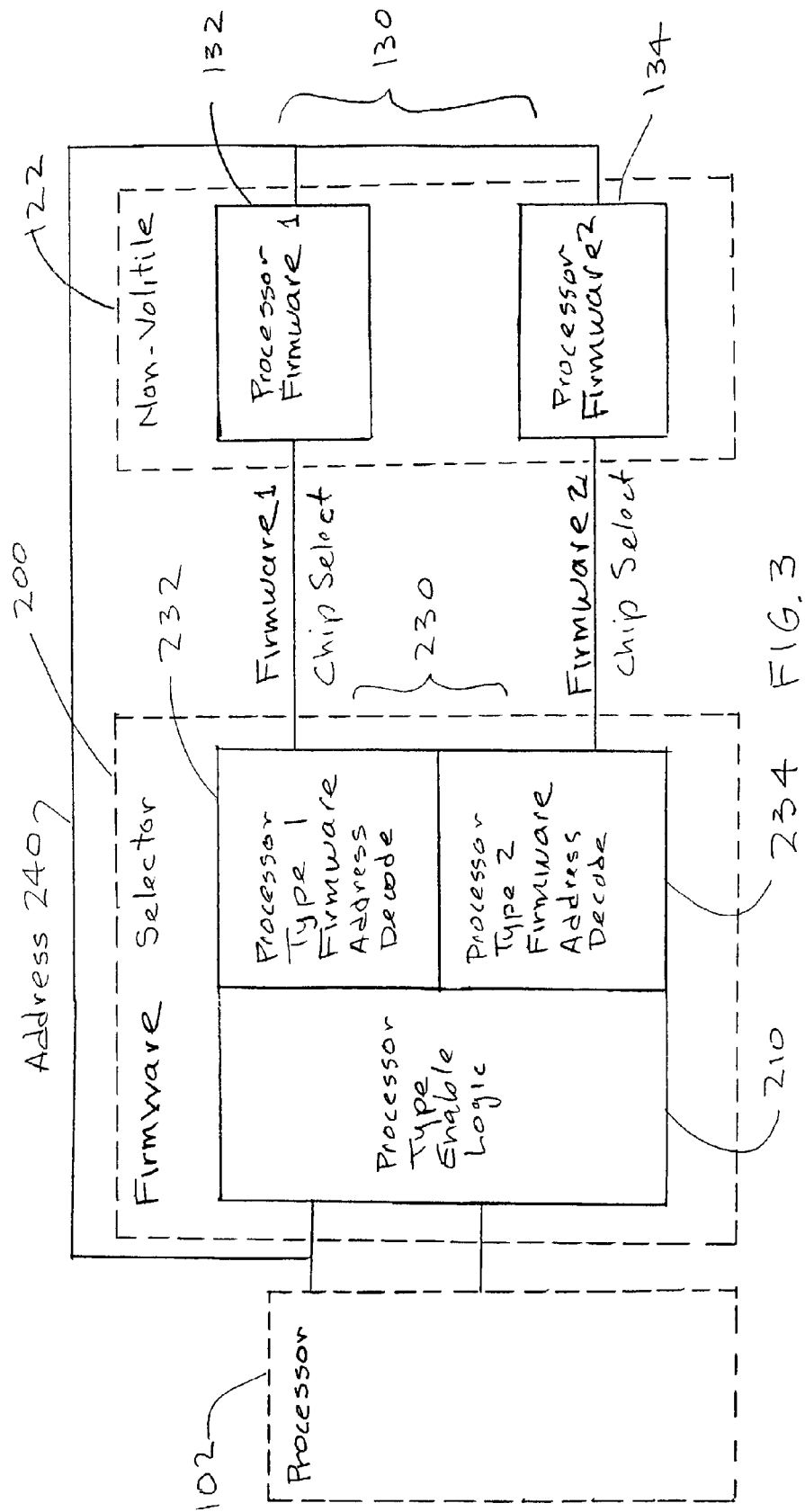
FIG. 3 is schematic block diagram of the firmware selector, the firmware memory, and the processor of FIG. 2 according to an embodiment of the invention.

FIG. 3 is schematic block diagram of a portion of the computer 200 of FIG. 2 including the processor 102, the firmware selector 202, and two of the firmware memories 1 and 2. The firmware selector 202 includes enable logic 210 for enabling access to the firmware memories 1 and 2 and first and second address decoders 232 and 234 for mapping the firmware memories to the appropriate address spaces of the computer 200. Specifically, the computer 200 is designed such that the processor 102 executes instructions from a predetermined address space (selected-firmware address) when starting the computer. Consequently, as discussed in more detail below, the decoders 232 and 234 map the firmware memory storing the firmware appropriate for and corresponding to the processor 102 to this address space, and map the other firmware memories to other address spaces.

Still referring to FIG. 3, the operation of the firmware selector 202 is discussed. When the computer 200 begins its start sequence, the processor 102 provides an identifier to the selector 202. Based on this identifier, the selector 202 determines and selects which firmware the processor 102 should execute. For example purposes, assume that the processor 102 should execute the firmware stored in the firmware memory 1.

Next, the address decoder 232 maps the firmware memory 1 to the selected-firmware address space, and the decoder 234 maps the firmware memory 2 to another non-selected-firmware address space for a non-selected firmware.

Then, the processor 102 begins loading and executing the firmware stored in the firmware memory 1. Specifically, the processor 102 drives the reset address, which is the first data fetch for the selected-firmware address space, onto the memory address 240. The enable logic 210 and the decoder 232 recognize this address and enable the firmware memory 1, which drives the first instruction of the firmware onto the data bus (not shown). Furthermore, the logic 210 and decoder 234 disable the firmware memory 2. The processor 102 loads the instruction from the data bus and executes it.

The processor 102, enable logic 210, and decoders 232 and 234 repeat this sequence until the processor finishes executing the firmware stored in the firmware memory 1.

After the computer 200 completes its start sequence and the operating system takes control, one can alter the firmware stored in the firmware memories 1 and 2 by accessing the respective address spaces. For example, to alter the firmware in the memory 1, one causes the processor 102 to write the desired new code to the selected firmware address space. Similarly, to alter the firmware in the memory 2, one causes the processor 102 to write the desired new code to the non-selected-firmware address (not shown) space to which the decoder 234 has mapped the firmware memory 2.

Still referring to FIG. 3, the operation of the firmware selector 202 is discussed where one changes the architecture of processor 102. The new processor is designed to correspond to and execute the firmware stored in the firmware memory 2. When the computer 200 begins its first start sequence after the change, the new processor 102 provides an identifier to the selector 202. Based on this identifier, the selector 202 determines that the new processor 102 should execute the firmware stored in the firmware memory 2. Next, the address decoder 234 maps the firmware memory 2 to the selected-firmware address space, and the decoder 232 maps the firmware memory 1 to another address space for the non-selected firmware. Then, the processor 102 begins loading and executing the firmware stored in the firmware memory 2. Specifically, the processor 102 drives the reset address, which is the first data fetch for the selected-firmware address space, onto the memory address 240. The enable logic 210 and the decoder 234 recognize this address and enable the firmware memory 2, which drives the first instruction of the firmware onto the data bus (not shown). Furthermore, the logic 210 and decoder 232 disable the firmware memory 1. The processor 102 loads the instruction from the data bus and executes it. The processor 102, enable logic 210, and decoders 232 and 234 repeat this sequence until the processor finishes executing the firmware stored in the firmware memory 2.

After the computer 200 completes its start sequence with the changed processor architecture, one can alter the firmware stored in the firmware memories 1 and 2 by accessing the respective address spaces. For example, to alter the firmware in the memory 2, one causes the processor 102 to write the desired new code to the selected-firmware address space. Similarly, to alter the firmware in the memory 1, one causes the processor 102 to write the desired new code to the non-selected-firmware address space to which the decoder 232 has mapped the firmware memory 1.

Therefore, such a firmware selector 202 allows one to upgrade or otherwise change the processor 102 without having to reprogram or replace the firmware memory or replace the circuit board (not shown) on which the memory is installed.

Other embodiments of the computer 200 are contemplated. For example, although the computer 200 is discussed in conjunction with FIG. 3 as having two firmware memories, the computer may have more than two firmware memories that allow the computer to support more than two different types of processors as shown in FIG. 2. Furthermore, although the firmware selector 202 is discussed as having the enable logic 210 and the address decoders 232 and 234, the selector may have any other architecture that allow the selector to operate in a manner that is the same or similar to that discussed above in conjunction to FIG. 3. In addition, although described as mapping the unused firmware memory to an address space, the selector 202 may merely disable the unused firmware memory such that it is inaccessible.

What is claimed is:

1. A firmware selector for a computer that includes a processor, the processor having an identity of a plurality of identities, the selector operable to:
   receive the identity of the processor;
   in response to receiving the identity, map a first firmware to a first location that the processor addresses during start of the computer and map, a second firmware to a second location that the processor is operable to address; and
   select the first firmware to be executed during the start up of the computer.

2. A firmware selector for a computer that includes a processor, the processor having an identity of a plurality of identities, the selector operable to:
   receive the identity of the processor;
   in response to receiving the identity, map a corresponding firmware to a first location that the processor addresses during start of the computer and man a non-corresponding firmware to a second location that the processor is operable to address; and
   cause the processor to access the corresponding firmware.

3. The firmware selector of claim 2, wherein at least one of the corresponding and non-corresponding firmware is stored in a non-volatile memory of the computer.

4. A computer, comprising:
   a processor having an identity of a plurality of identities and operable to provide the identity;
   a plurality of firmware memories that are operable to store respective firmware; and
   a firmware selector coupled to the processor and to the firmware memories, the selector operable, in response to the processor identity, to select a first firmware to be executed during the start up of the computer, map a first firmware memory storing the first firmware to a first location that the processor addresses during start of the computer and map a second firmware memory storing a second firmware to a second location that the processor is operable to address.

5. The computing device of claim 4, wherein the firmware memories each comprise a respective non-volatile memory.

6. A method, comprising:
   receiving an identity of a processor;
   mapping a first firmware to a first location that the processor addresses during start of the computer;
   mapping a second firmware to a second location that the processor is operable to address; and
   in response to receiving the identity, selecting the first firmware to be executed during the start up of the computer.

7. The method of claim 6 wherein selecting the firmware comprises selecting the firmware from a plurality of firmware.

8. A method, comprising:
   receiving an identity of a processor;
   in response to receiving the identity, mapping a corresponding firmware to a first location that the processor addresses during start of the computer,
   mapping a non-corresponding firmware to a second location that the processor is operable to address; and causing the processor to execute the corresponding firmware.

9. A method, comprising:

providing a computer that includes:
- a plurality of firmware memories that are operable to store respective firmware; and
- a firmware selector coupled to the firmware memories, the selector operable, in response to a processor identity, to select a first firmware to be executed during the start up of the computer, map a first firmware memory storing the first firmware to a first location that the processor addresses during start of the computer, and map a second firmware memory storing a second firmware to a second location that the processor is operable to address;

installing in the computer a processor that is operable to provide its identity;

receiving the identity of the processor by the firmware selector; and in response to the identity, the firmware selector selecting a first firmware to be executed during the start up of the computer, mapping a first firmware memory storing the first firmware to a first location that the processor addresses during start of the computer, and mapping a second firmware memory storing a second firmware to a second location that the processor is operable to address.

* * * * *

UNITED STATES PATENT AND TRADEMARK OFFICE
CERTIFICATE OF CORRECTION

| | | |
|---|---|---|
| PATENT NO. | : 7,003,656 B2 | Page 1 of 1 |
| APPLICATION NO. | : 10/171873 | |
| DATED | : February 21, 2006 | |
| INVENTOR(S) | : Sachin Chheda et al. | |

It is certified that error appears in the above-identified patent and that said Letters Patent is hereby corrected as shown below:

IN THE CLAIMS

Claim 2, Column 6, line 24, delete "man" and insert therefor --map--

Claim 8, Column 6, line 65, after "start" insert --up--

Signed and Sealed this

Sixteenth Day of October, 2007

JON W. DUDAS
*Director of the United States Patent and Trademark Office*